Figure 1:
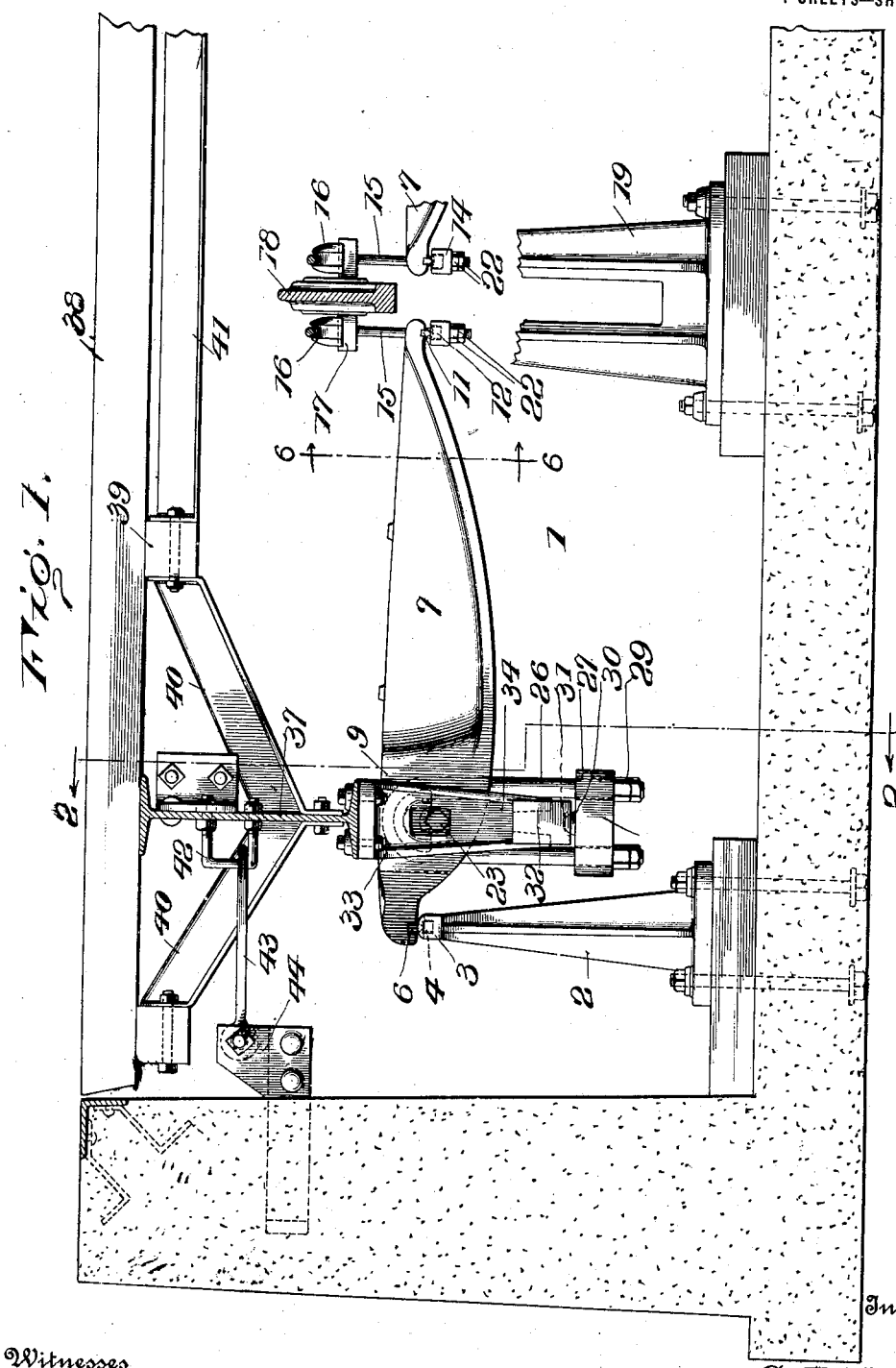

C. F. MOORE & E. L. HUNTER
WEIGHING SCALE.
APPLICATION FILED SEPT. 9, 1914.

1,167,311.

Patented Jan. 4, 1916.
4 SHEETS—SHEET 1.

Witnesses
W. A. Williams
Asa H. Bright

Inventors
C. F. Moore
E. L. Hunter
By E. B. Stocking
Attorney

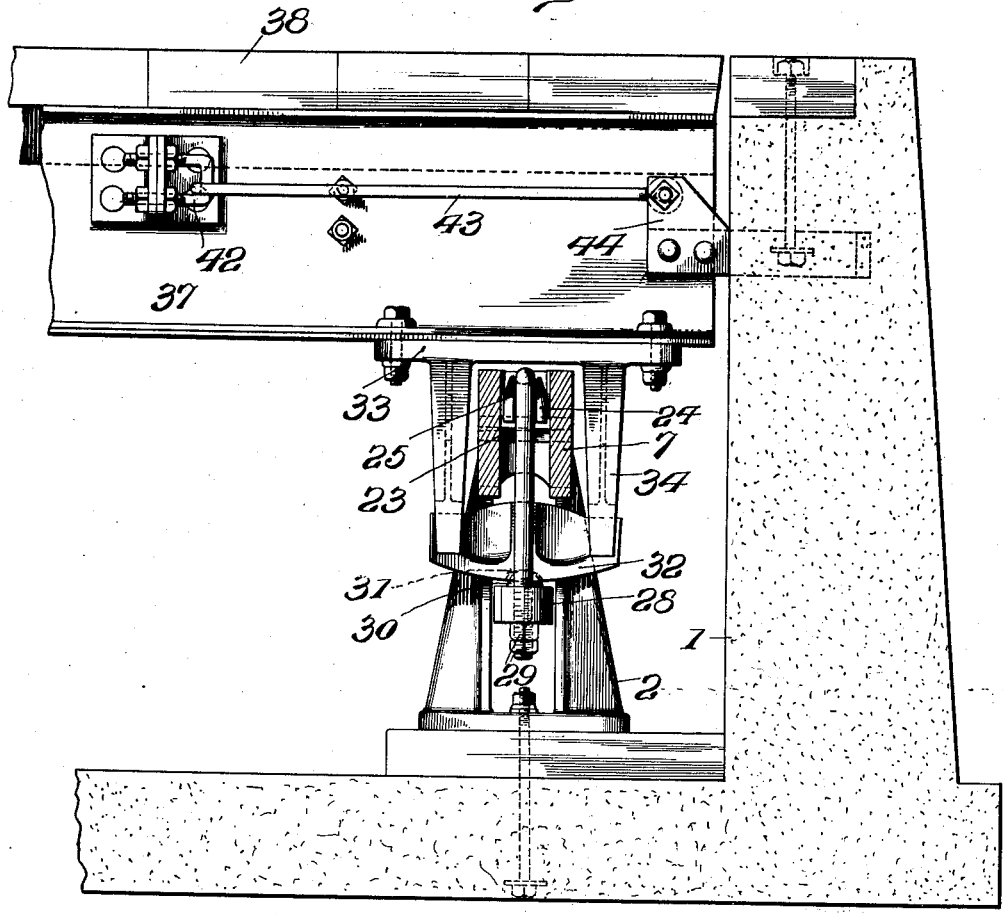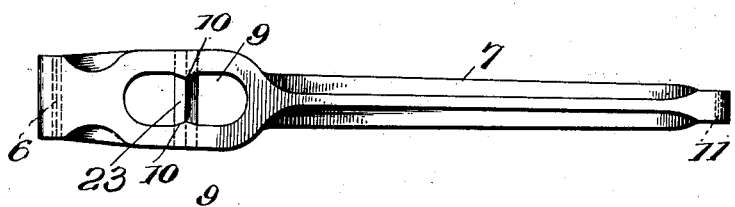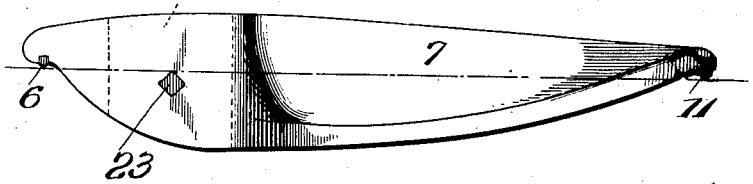

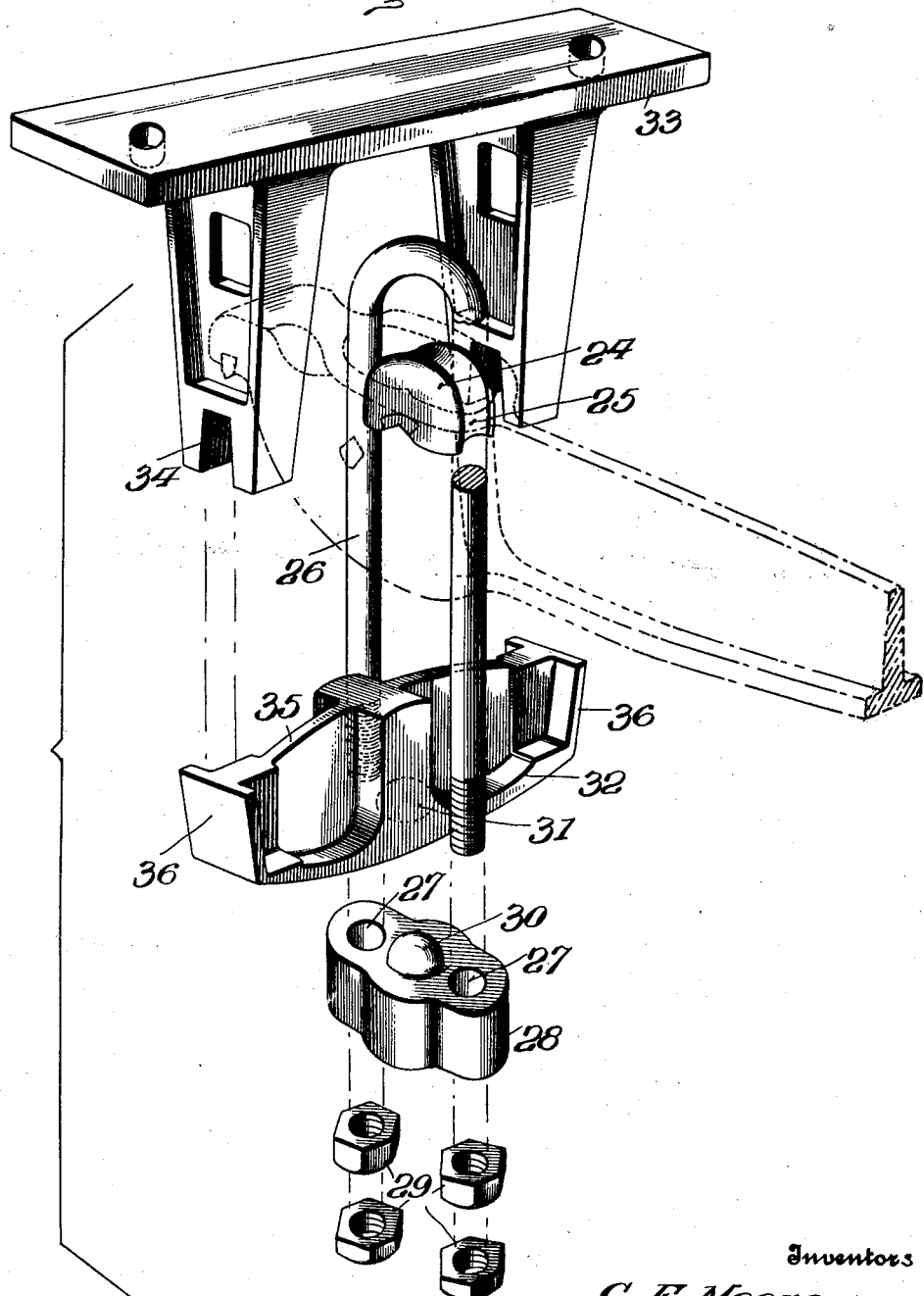

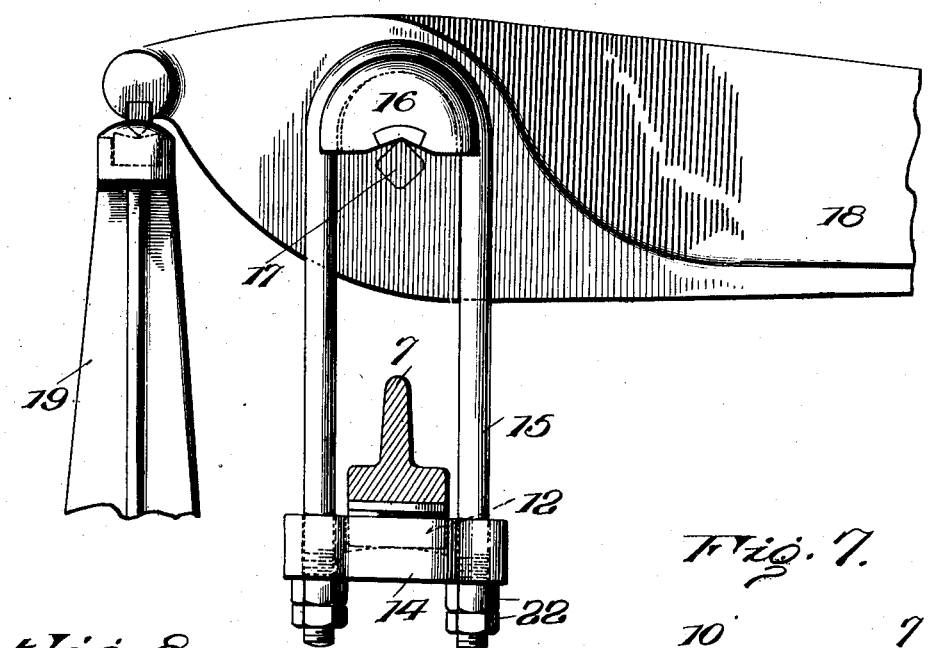
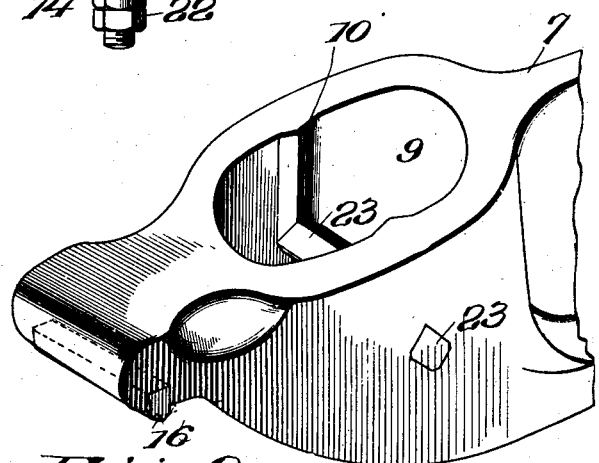
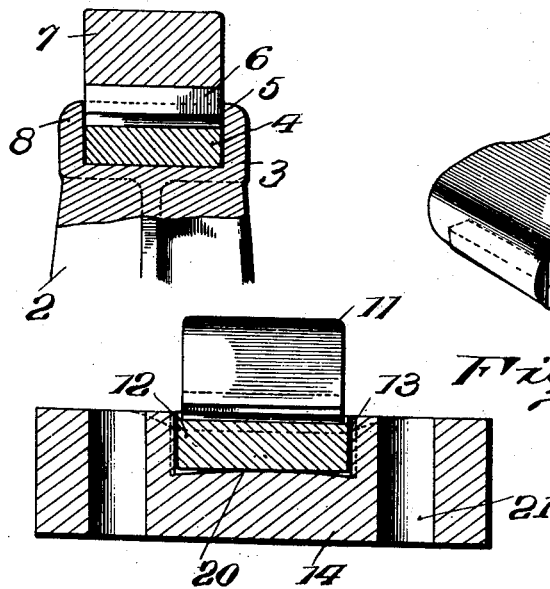
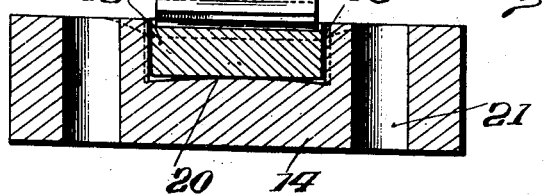

UNITED STATES PATENT OFFICE.

CHARLES F. MOORE AND EVERETT L. HUNTER, OF BENNINGTON, VERMONT, ASSIGNORS TO BENNINGTON SCALE COMPANY, OF BENNINGTON, VERMONT, A CORPORATION OF VERMONT.

WEIGHING-SCALE.

1,167,311.  Specification of Letters Patent.  Patented Jan. 4, 1916.

Application filed September 9, 1914. Serial No. 860,900.

*To all whom it may concern:*

Be it known that we, CHARLES F. MOORE and EVERETT L. HUNTER, citizens of the United States, residing at Bennington, in the county of Bennington and State of Vermont, have invented certain new and useful Improvements in Weighing-Scales, of which the following is a specification, reference being had therein to the accompanying drawing.

This invention relates to certain new and useful improvements in weighing scales, and more particularly to suspension bearings for platform scales, the object being to provide means for suspending the platform from the main levers in such a manner that the suspension means will have universal movement in order to allow the suspension means to move with the platform so as to compensate for the end or side thrust caused by a vehicle or other movable object passing onto or off of the platform.

Another object of the invention is to provide means for adjusting the tip bearing support and load receiver supporting bearing to enable the levers to be readily installed so that the knife-edge pivots thereof will be in a common plane.

Another object of the invention is to provide a novel form of underframing for the platform by means of which rigidity is obtained and a construction is formed which allows the interior of the pit to have a clearance for the inspection of the lever constructions to facilitate the installation and repairing of the scales.

Another object of the invention is to provide a novel form of main lever in which the knife-edge pivots are arranged in a common plane and are so disposed that an exceedingly strong and durable lever is formed in which the weight of the lever is decreased without decreasing the strength thereof.

Another and further object of the invention is to provide a suspension bearing in which the knife-edge load receiver pivot engages the full length of the saddle block bearing upon which is mounted, a substantially inverted U-shaped suspension member having a ball block adjustably carried thereby which in turn has a universal connection with the platform supporting member engaging the platform framing, in such a manner that the platform can be adjusted to a level plane.

Another object of the invention is to provide an adjustable bearing for the knife-edge pivot at the tip of the lever in order to allow the lever to be leveled in installing the same, said adjustable bearing having a universal or rocking movement.

Another and further object of the invention is to provide a platform scale construction which is simple and cheap and one which can be readily set up in the pit so as to obtain quickly, perfect adjustment of the respective levers in order to obtain the desired result.

Other and further objects and advantages of the invention will be hereinafter set forth and the novel features thereof defined by the appended claims.

In the drawings—Figure 1 is a vertical section through a pit showing the application of our improved construction of suspension bearings for platform scales in elevation; Fig. 2, is a vertical section taken on the line 2—2 of Fig. 1; Fig. 3 is a top plan view of one of the main levers; Fig. 4, is a side elevation of one of the main levers; Fig. 5, is a perspective of the platform supporting member, main lever, saddle block, U-shaped suspension member, connecting member, and ball block member, detached: Fig. 6, is a section taken on the line 6—6 of Fig. 1, showing the adjustable bearing for the tip of the lever; Fig. 7, is a detailed perspective view of the butt of the lever; Fig. 8, is a detailed vertical section through the upper portion of the fulcrum stand and bearing; and Fig. 9, is a detailed section through the lever tip supporting bearing.

Like numerals of reference refer to like parts in the several figures of the drawings.

In the drawings, 1 indicates the concrete construction of a scale pit in which is arranged a series of fulcrum stands 2, and while we have only shown one of these stands, it is of course understood that four or more main levers are employed, and a description of one will be sufficient for all.

The stand is provided with a head 3 having a recess in which is mounted a block 4 provided with a hardened steel bearing 5 upon which is mounted the fulcrum knife-edge pivot 6 of the main lever 7, said knife-edge pivot having a bearing throughout its length upon the bearing block of the fulcrum stand and is prevented from moving sidewise upon the bearing block by end projections 8, as shown in Fig. 8.

In constructing a complete scale in accordance with our invention, four or more levers are employed, each lever having a solid butt provided with a vertical opening 9, as clearly shown in Fig. 7, the opposite walls of which are provided with vertically disposed projections 10 for the purpose hereinafter fully described. The opposite end portion of the main lever 7 is substantially T-shaped in cross section and is provided with a tip knife-edge pivot 11 mounted upon a rocking bearing 12 mounted loosely within a recess 13 formed in the upper surface of the connecting block 14 which is adjustably carried by a substantially inverted U-shaped suspension member 15 mounted upon a saddle block 16 which has a bearing upon one of the laterally projecting extension lever knife-edge pivots 17 carried by the extension lever 18 which is in turn, mounted in a suitable standard 19. It is, of course, understood that the extension lever is provided with oppositely disposed knife-edge pivots upon which is mounted a similar support upon the opposite side to receive the tip of one of the other main levers. The recess 13 in the connecting block 14 is provided with a convex bottom 20 in order to allow the bearing block 12 to have a rocking movement therein, said block rocking to compensate for the movement of the respective levers in order to maintain the knife-edge pivot in substantially the same common plane when the scale is in operation.

The manner of adjustably mounting the connecting block 14 upon the substantially inverted U-shaped member 15 herein shown, is to provide the legs of the inverted U-shaped member with threads which pass through openings 21 formed in the connecting block 14 and are adjustably held in position thereon, by lock nuts 22 by means of which, the connecting block 14 can be adjusted vertically so that in installing the main levers the knife-edge pivots carried by the tip end and butt of the lever can be adjusted to a common plane. In installing the levers the fulcrum stand is placed in position first and the main lever with its knife-edge bearing is placed in position upon the bearing of the fulcrum stand. It is, of course, understood that the extension lever has been placed in position upon its stand with its supporting means. The tip knife-edge pivot of the main lever is then placed in position upon the supporting bearing of the connecting block and by adjusting the nuts 22, the tip knife-edge pivot can be moved into horizontal alinement with the fulcrum knife-edge pivot of the butt of the lever.

Extending through the walls of the main lever across the vertical opening thereof in alinement with the enlargements, is a knife-edge load receiver pivot 23 upon which is mounted a saddle block 24 having a hardened steel bearing surface contacting with the knife-edge pivot and provided with an annular groove 25 in its upper surface to receive the arch of a substantially inverted U-shaped suspension member 26 which extends through the lower end of the vertical opening of the lever 7 and is provided with threaded ends which extend through openings 27 formed in a ball block 28 which is adjustably mounted upon the depending legs of the inverted U-shaped member by lock nuts 29 in order to allow the ball block to be adjusted vertically upon the legs for the purpose hereinafter fully described.

The enlargements 10 formed in the opening of the main lever form concentrated bearings for the sides of the saddle blocks in order to reduce the friction.

The ball block 28 is provided with a semi-spherical projection 30 upon its upper surface extending into a similar-shaped recess 31 formed in the under side of the connecting member 32, as clearly shown in Fig. 1. Straddling the slotted portion of the lever is a platform supporting member 33 which is provided with bifurcated legs 34 which embrace vertical ribs 35 formed on the top of the connecting member 32, said connecting member being provided with end extensions 36 in order to hold the legs of the platform supporting member in proper position upon the connecting member. It will be seen from this construction that a universal connection is formed between the ball block and connecting member of the platform supporting member by means of which the platform supporting member is allowed to swing freely with the movement of the platform without affecting the bearings of the levers which remain at rest when a vehicle or other object is passing on or off of the platform. It will be seen that the thrust imparted to the platform is compensated for by the universal connection at this point and a suspension bearing is formed which allows the platform supporting member to be vertically adjusted. It will also be noted that the construction of suspension bearing herein shown, enables the strain to be thrown indirectly upon the full length of the load receiver pivot of the lever in such a manner that side strain is dispensed with and a load receiving bearing is constructed which receives the load in such a manner that all danger of any grinding of the bearings is dispensed with.

The platform supporting member is connected to the platform girder 37 by bolts, as clearly shown, said girder extending longitudinally of the platform and upon which the usual deck or planking 38 is mounted which is in horizontal alinement with the top edge of the pit, as clearly shown in Fig. 1, the edge of the pit being reinforced, as clearly shown, to prevent chipping. Secured to the under side of the deck 38 to each side of the I beams 37 are platform beams 39 connected to the I beams by diagonal braces 40, said braces being preferably formed of angle irons whereby a rigid construction of underframing is formed which reduces the weight of construction and yet maintains the rigidity. By this construction, the heavy underframing now employed with previous constructions of scales is dispensed with and a construction is produced which has all of the advantages of previous constructions and at the same time, allows more room within the pit in order to facilitate the installing of the platform and the repairing of the parts of the scale proper.

In constructing the platform of the scale, two I beams and four platform beams are employed, the center platform beams, not shown, being connected together by angle irons 41.

With a construction of suspension bearings and lever mounts as herein shown, it is not essential to provide platform-controlling means. However, we have shown the I beams provided with U-shaped brackets 42 to which are connected controlling members 43 mounted in suitable bearings 44 carried by the sides of the pit.

From the foregoing description, it will be seen that we have provided a novel form of suspension bearings and main levers for a platform scale in which means is provided for adjusting the platform supporting member in order to adjust the platform so as to bring the tread surface thereof into horizontal alinement with the tread surface of the pit.

It will also be seen that we have provided means for adjusting the tip knife-edge pivots of the levers into a common plane.

While we have shown and described a construction which is especially adapted to be used in connection with platform scales, we do not wish to limit ourselves to the use of the supporting bearings and platform supporting members to any form of scale, as it might be found that the construction as herein described, could be used in connection with various other forms of scale without departing from the spirit of our invention.

We claim:

1. In a weighing scale, the combination with a lever, of a load-receiver pivot mounted within said lever, a saddle block mounted upon said load-receiver pivot, a U-shaped suspension member embracing said saddle block, a platform supporting member embracing said lever, a connecting member for said platform supporting member, a ball block carried by said U-shaped suspension member having a universal connection with said platform connecting member, and means for adjusting said ball block.

2. In a weighing scale, the combination with a lever having a pivot, a saddle block mounted upon said pivot, a U-shaped suspension member embracing said saddle block, a platform supporting member embracing said lever, a connecting member for said platform supporting member, and a ball block adjustably mounted upon said U-shaped suspension member having a universal connection with said connecting member.

3. In a weighing scale, the combination with a lever having a load-receiver pivot, of a saddle block mounted upon said load-receiver pivot, a suspension member embracing said saddle block, a platform supporting member embracing said lever, adjustable supporting means carried by said suspension member, and a connecting member for said platform supporting member having a universal connection with said supporting means.

4. In a weighing scale, the combination with a lever having a pivot, a saddle block mounted upon said pivot, a suspension member embracing said saddle block, a block adjustably mounted upon said suspension member, a connecting member mounted upon said block and having a universal movement thereon, and a platform supporting member embracing said lever and mounted upon said connecting member.

5. In a weighing scale, the combination with a lever having a pivot, a saddle block mounted upon said pivot, a suspension member embracing said saddle block, a block adjustably mounted upon said suspension member, a connecting member mounted upon said block and extending transversely of said lever and having a universal movement upon said block, and a platform supporting member embracing said lever mounted upon said connecting member.

6. In a weighing scale, the combination with a lever having a fulcrum pivot at one end and a tip pivot at its opposite end, of a load-receiver pivot arranged intermediate said first mentioned pivot, a saddle block mounted upon said load-receiver pivot, a U-shaped suspension member embracing said saddle block, a platform supporting member embracing said lever, a connecting member for said load-receiver platform supporting member, a ball block carried by said U-shaped suspension member having a universal connection with said platform supporting member, and means for adjusting said ball block.

7. A platform supporting means for weighing scales, comprising a platform supporting member having bifurcated legs, a connecting member provided with ribs over which said legs are mounted, an adjustable supporting block upon which said connecting member is mounted, and suspension means for said adjustable supporting member.

8. A platform supporting means for weighing scales, comprising a platform supporting member having bifurcated legs, a connecting member provided with ribs over which said legs are mounted, said connecting member being provided with a socket, and an adjustable supporting block having a projection extending into said socket and upon which said connecting member is mounted for universal movement.

9. A platform supporting means for weighing scales, comprising a platform supporting member having depending bifurcated legs, a connecting member for said legs provided with ribs extending into the bifurcations of said legs, and an adjustable supporting block upon which said connecting member is mounted for universal movement.

10. In a weighing machine, a lever having a tip-knife edge pivot, a rocking bearing having a universal movement for said pivot, adjustable supporting means for said rocking bearing, a saddle block carried by said supporting means, and a supporting pivot for said saddle block.

11. In a weighing scale, the combination with a main lever having a tip pivot, of a supporting pivot, a saddle block carried by said supporting pivot, a U-shaped suspension member embracing said saddle block, an adjustable connecting block carried by said suspension member, and a tip pivot bearing carried by said connecting block having a universal movement independent of said U-shaped suspension member.

12. In a weighing scale, the combination with a lever having a tip pivot, of a supporting pivot, a saddle block carried by said supporting pivot, a U-shaped suspension member embracing said saddle block, a connecting block adjustably mounted upon said U-shaped suspension member having a recess, and a bearing for said tip pivot mounted within said recess having universal movement independent of said U-shaped suspension member.

13. In a weighing scale, the combination with a supporting pivot, a saddle block mounted upon said pivot, a suspension member embracing said saddle block, an adjustable member carried by said suspension member provided with a recess, and a rocker bearing mounted in said recess and capable of moving independently of said suspension member.

14. A lever, having a tip-knife edge pivot, a rocker bearing for said pivot, an adjustable support for said bearing in which said bearing is mounted to move independently of said support, a saddle block for supporting said support, and a pivot upon which said saddle block is mounted.

15. In a weighing scale, the combination with a lever having a vertical opening across which extends a load-receiving knife-edge pivot, of a saddle block mounted upon said load-receiving pivot, a U-shaped suspension member embracing said saddle block, a platform supporting member embracing said lever, a connecting member for said platform supporting member having a socket, a ball block carried by said U-shaped suspension member having a semi-spherical projection fitting within the socket of said connecting member, and means for adjusting said ball block upon said U-shaped suspension member.

16. In a weighing scale, the combination with a lever having a vertical opening formed therein, of a knife-edge pivot extending across said opening, a saddle block bearing mounted upon said knife-edge pivot, a U-shaped suspension member mounted upon said saddle block, a platform supporting member embracing said lever having bifurcated ends, a connecting block provided with ribs to receive said bifurcated end, said connecting block having a socket, and a ball block adjustably connected with said U-shaped suspension member having a semi-spherical shaped projection fitting within the socket of said connecting member.

17. In a scale, a lever having a vertical opening provided with oppositely disposed enlargements, a load-receiver knife-edge pivot extending across said opening in alinement with said enlargement, a saddle block arranged within the opening of said lever upon said load-receiver pivot having contact with the enlargements of said opening, a U-shaped suspension member embracing said saddle block and depending from said lever, a platform supporting member embracing said lever having bifurcated legs, a connecting block provided with ribs to receive said bifurcated legs of said platform supporting member, means carried by said connecting block for preventing lateral movement in respect to said platform supporting member, said connecting block having a socket, and a ball block adjustably connected with said U-shaped suspension member having a projection extending within said socket.

18. In a weighing scale, the combination with a lever provided with a solid butt having a vertically disposed opening formed therein, of a pivot extending across said opening midway of the width with said lever, a saddle block mounted upon said pivot within said opening, a U-shaped suspension member carried by said saddle block, a platform supporting member embracing said lever having depending legs provided with bifurcated ends, a connecting block provided with vertical ribs extending into the bifurcations of said legs, said connecting block having a socket, a ball block carried by said U-shaped suspension member, a projection carried by said ball block extending into the socket of said connecting member, and means for adjusting the position of said ball block upon said U-shaped suspension member.

19. In a weighing scale, the combination with a lever having a load-receiving pivot disposed across a vertical opening formed therein, of a platform supporting member embracing said lever over said opening of said lever having a bearing upon said load-receiving pivot, a U-shaped suspension member embracing said saddle block having threaded legs, a connecting member for said platform supporting member having a socket, a ball block provided with openings to receive the threaded legs of said U-shaped suspension member, nuts mounted upon said threaded legs for adjusting said ball block, and a segmental ball formed on said ball block extending into the socket of said connecting member.

20. In a weighing scale, a lever having a pivot, a rocker bearing for said pivot having universal movement, and an adjustable support for said rocker bearing.

21. In a weighing scale, the combination with a lever having a vertical opening across which extends a load receiver knife-edge pivot, of a saddle block mounted upon said load-receiver pivot, a U-shaped suspension member embracing said saddle block, a platform supporting member embracing said lever, a connecting member for said platform supporting member, and a block adjustably mounted upon said U-shaped suspension member upon which said connecting member is mounted for universal movement.

22. In a weighing scale, the combination with a lever having a vertical opening formed therein, of a knife-edge pivot extending across said opening, a saddle block mounted upon said pivot, a suspension member mounted upon said saddle block, a platform supporting member embracing said lever, a connecting member for said platform supporting member, and a block adjustably mounted upon said suspension member upon which said connecting member is mounted for universal movement.

23. In a platform scale, the combination with a series of main levers having fixed fulcrum bearings for the fulcrum knife-edge pivot, adjustable tip bearings with a universal movement for the tip knife-edge pivots, of a load-receiver pivot disposed between the tip pivot and the fulcrum pivot, U-shaped suspension means having a bearing upon said load-receiver pivot, and a platform supporting member mounted for universal movement upon said U-shaped suspension means.

24. In a weighing scale, the combination with a main lever having a solid butt portion provided with a vertical opening, the opposing walls of which are centrally enlarged, of a load-receiver knife-edge pivot extending through the walls of said opening in alinement with said enlargements, a saddle block fitting within the opening of said lever and contacting with the enlargements thereof, and load-supporting means carried by said saddle block.

25. In a weighing scale, the combination with a lever, of a U-shaped member carried by said lever, an adjustable block carried by said U-shaped member, a connecting member mounted upon said block having a universal movement thereon, and a platform supporting member mounted upon said connecting member.

26. In a weighing scale, the combination with a lever, of a U-shaped member carried by said lever, a block adjustably mounted upon said U-shaped member, a connecting member mounted upon said block, and a platform supporting member mounted upon said connecting member.

27. A lever, having a vertical opening disposed adjacent one end thereof, the opposite walls of said lever being provided with vertically disposed enlargements, a load knife-edge pivot disposed across said opening in alinement with said enlargements, a saddle block arranged within said opening having its sides contacting with the enlargement thereof, and U-shaped suspension means carried by said saddle block.

In testimony whereof we affix our signatures in presence of two witnesses.

CHARLES F. MOORE.
    EVERETT L. HUNTER.

Witnesses:
 C. L. HOLDEN,
 E. H. HOLDEN.

Copies of this patent may be obtained for five cents each, by addressing the "Commissioner of Patents, Washington, D. C."